United States Patent
Lu et al.

(10) Patent No.: US 11,038,271 B2
(45) Date of Patent: Jun. 15, 2021

(54) COMMUNICATION DEVICE

(71) Applicant: Quanta Computer Inc., Taoyuan (TW)

(72) Inventors: Jun-Yu Lu, Taoyuan (TW); Chun-I Lin, Taoyuan (TW); Hui Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 26 days.

(21) Appl. No.: 16/710,398

(22) Filed: Dec. 11, 2019

(65) Prior Publication Data
US 2021/0091467 A1 Mar. 25, 2021

(30) Foreign Application Priority Data

Sep. 25, 2019 (TW) .................................. 108134511

(51) Int. Cl.
*H01Q 1/24* (2006.01)
*H01Q 5/328* (2015.01)
*H01Q 9/04* (2006.01)
*H01Q 1/48* (2006.01)

(52) U.S. Cl.
CPC .............. *H01Q 5/328* (2015.01); *H01Q 1/48* (2013.01); *H01Q 9/045* (2013.01); *H01Q 9/0421* (2013.01)

(58) Field of Classification Search
CPC .......... H01Q 5/328; H01Q 1/48; H01Q 9/045; H01Q 9/0421; H01Q 1/243
See application file for complete search history.

(56) References Cited

U.S. PATENT DOCUMENTS

| 9,088,067 | B2 | 7/2015 | Wong et al. | |
| 2013/0135164 | A1* | 5/2013 | Asanuma | H01Q 9/26 343/749 |
| 2015/0162659 | A1* | 6/2015 | Wong | H01Q 7/00 343/729 |

FOREIGN PATENT DOCUMENTS

TW 201415716 A 4/2014

OTHER PUBLICATIONS

Chinese language office action dated Sep. 15, 2020, issued in application No. TW 108134511.

* cited by examiner

*Primary Examiner* — Dieu Hien T Duong
(74) *Attorney, Agent, or Firm* — McClure, Qualey & Rodack, LLP

(57) ABSTRACT

A communication device includes a ground metal element and an antenna element. The antenna element includes a first metal element, a second metal element, a third metal element, a first capacitive element, a second capacitive element, an inductive element, and a signal feeding source. A first connection point of the first metal element is coupled through the first capacitive element to the third metal element. A second connection point of the first metal element is coupled through the second capacitive element to the ground metal element. A third connection point of the second metal element is coupled through the inductive element to the third metal element. A shorting end of the third metal element is coupled to the ground metal element. The signal feeding source is coupled between the first metal element and the third metal element or the ground metal element.

10 Claims, 6 Drawing Sheets

COMMUNICATION DEVICE

CROSS REFERENCE TO RELATED APPLICATIONS

This application claims priority of Taiwan Patent Application No. 108134511 filed on Sep. 25, 2019, the entirety of which is incorporated by reference herein.

BACKGROUND OF THE INVENTION

Field of the Invention

The disclosure generally relates to a communication device, and more particularly, it relates to a communication device and an antenna element therein.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, 2500 MHz, and 2700 MHz. Some devices cover a small wireless communication area; these include mobile phones using Wi-Fi and Bluetooth systems and using frequency bands of 2.4 GHz, 5.2 GHz, and 5.8 GHz.

In order to improve their appearance, designers often incorporate metal elements into mobile devices. However, these newly added metal elements tend to negatively affect the operation of antennas used for wireless communication in mobile devices, thereby degrading the overall communication quality of the mobile devices. For example, many current brand factories develop mobile devices with large displays and narrow borders, but this trend also suppresses the design space available for antennas. As a result, there is a need to propose a novel solution, so as to overcome the problems of the prior art.

BRIEF SUMMARY OF THE INVENTION

In an exemplary embodiment, the disclosure is directed to a communication device including a ground metal element and an antenna element. The antenna element includes a first metal element, a second metal element, a third metal element, a first capacitive element, a second capacitive element, an inductive element, and a signal feeding source. The first metal element has a first connection point and a second connection point. The second metal element has a third connection point and a first open end. The third metal element has a shorting end and a second open end. The shorting end is coupled to the ground metal element. The second open end is kept apart from the ground metal element by the antenna's height. The first connection point is coupled through the first capacitive element to the third metal element. The second connection point is coupled through the second capacitive element to the ground metal element. The third connection point is coupled through the inductive element to the third metal element. The signal feeding source is coupled between the first metal element and the third metal element or the ground metal element.

In some embodiments, the antenna element covers a first operation frequency band and a second operation frequency band. The first operation frequency band is lower than the second operation frequency band.

In some embodiments, the first current resonant path of the first operation frequency band is from the signal feeding source through the first metal element, the first capacitive element, the third metal element, the inductive element, and the second metal element to the first open end. The second current resonant path of the second operation frequency band is from the signal feeding source through the first metal element, the first capacitive element, and the third metal element to the second open end.

In some embodiments, the first metal element, the second metal element, and the third metal element extend in the same direction.

In some embodiments, the first metal element and the second metal element are at least partially surrounded by the third metal element and the ground metal element.

In some embodiments, the capacitance of the first capacitive element is from 2 to 5 times that of the second capacitive element.

In some embodiments, the first capacitive element and the second capacitive element are implemented with distributed capacitors.

In some embodiments, the inductance of the inductive element is from 4 nH to 12 nH.

In some embodiments, when the antenna element operates in the first operation frequency band, the inductive element is almost used as a short-circuited element. When the antenna element operates in the second operation frequency band, the inductive element is almost used as an open-circuited element.

In some embodiments, the total length of the antenna element is from 0.1 to 0.3 wavelength of the lowest frequency of the first operation frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
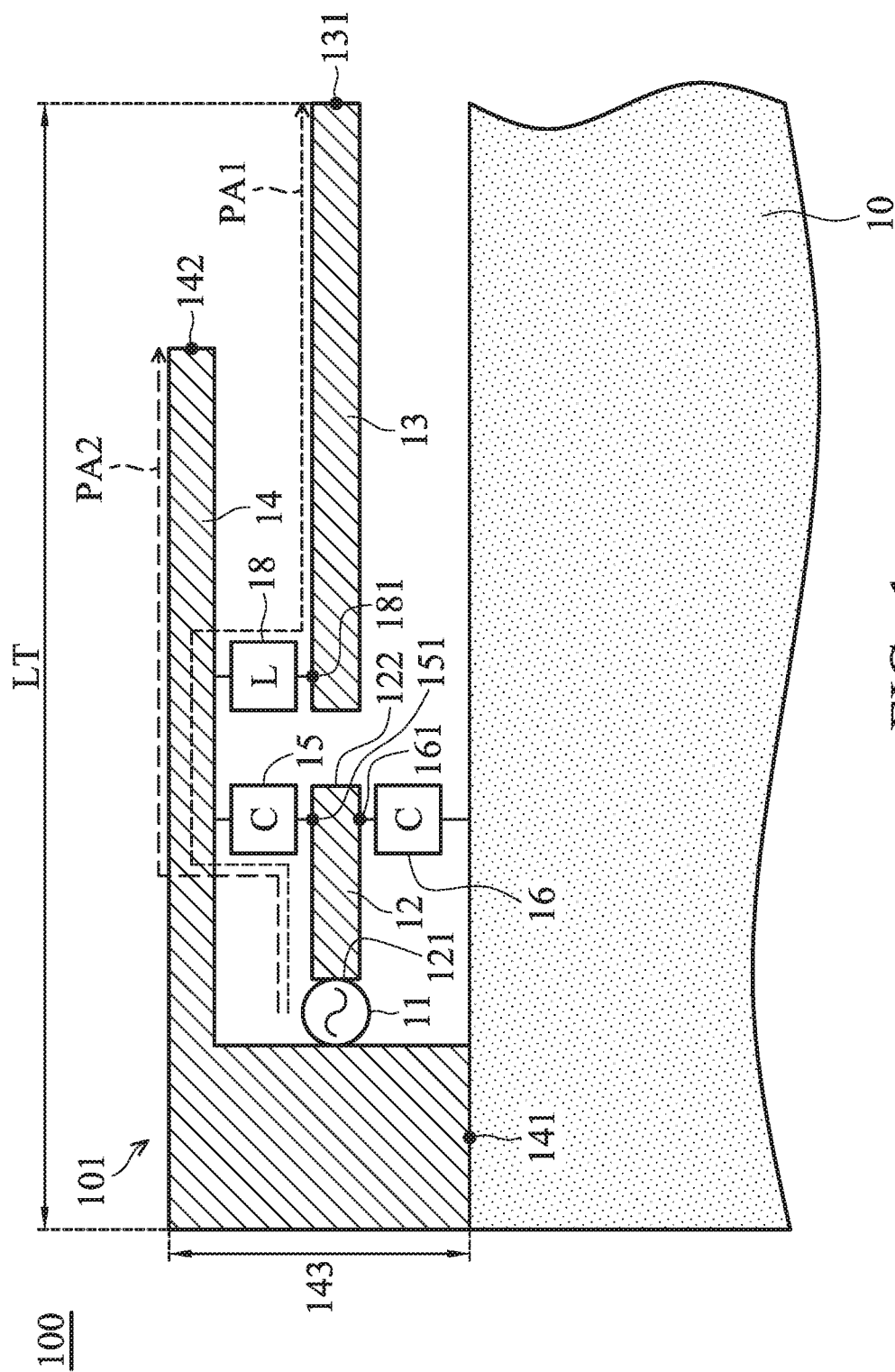
FIG. 1 is a diagram of a communication device according to a first embodiment of the invention.

FIG. 1 is a diagram of a communication device 100 according to a first embodiment of the invention. As shown in FIG. 1, the communication device 100 includes a ground metal element 10 and an antenna element 101. For example, the ground metal element 10 may select a ground plane size of a 14" notebook computer (300×200 $mm^2$), but it is not limited thereto. The antenna element 101 may be formed on a dielectric substrate (not shown), such as an FR4 (Flame Retardant 4) substrate. Specifically, the antenna element 101 includes a signal feeding source 11, a first metal element 12, a second metal element 13, a third metal element 14, a first capacitive element 15, a second capacitive element 16, and an inductive element 18. The signal feeding source 11 may be an RF (Radio Frequency) module, a metal spring, a coaxial line, a microstrip line, a waveguide, or any combination thereof. The signal feeding source 11 may be coupled between the first metal element 12 and the third metal element 14, so as to excite the antenna element 101. The first metal element 12 may substantially have a short straight-line shape. The first metal element 12 has a feeding end 121, a connection end 122, a first connection point 151, and a second connection point 161. The feeding end 121 is coupled to the signal feeding source 11. The second metal element 13 may substantially have a long straight-line shape. The second metal element 13 has a third connection point 181 and a first open end 131. The third metal element 14 may substantially have a variable-width L-shape. The third metal element 14 has a shorting end 141 and a second open end 142. The width of the shorting end 141 may be larger than the width of the second open end 142. The connection end 122 of the first metal element 12, the first open end 131 of the second metal element 13, and the second open end 141 of the third metal element 14 may extend in the same direction (e.g., the right direction of FIG. 1). The first metal element 12 and the second metal element 13 are at least partially surrounded by the third metal element 14 and the ground metal element 10. The first connection point 151 and the second connection point 161 may be positioned at two opposite sides of the connection end 122 of the first metal element 12, respectively. The third connection point 181 may be positioned at a side of another end of the second metal element 13 (opposite to the first open end 131). However, the invention is not limited thereto. In alternative embodiments, the first connection point 151 and the second connection point 161 are set at different positions of the first metal element 12, and the third connection point 181 is set at a different position of the second metal element 13. The first connection point 151 of the first metal element 12 is coupled through the first capacitive element 15 to the third metal element 14. The second connection point 161 of the first metal element 12 is coupled through the second capacitive element 16 to the ground metal element 10. The capacitance of the first capacitive element 15 may be greater than the capacitance of the second capacitive element 16. The third connection point 181 of the second metal element 13 is coupled through the inductive element 18 to the third metal element 14. It should be noted that the first capacitive element 15 and the inductive element 18 are coupled to different positions of the third metal element 14. The shorting end 141 of the third metal element 14 is coupled to the ground metal element 10. The second open end 142 of the third metal element 14 is kept apart from the ground metal element 10 by the antenna height 143.

Figure 2:
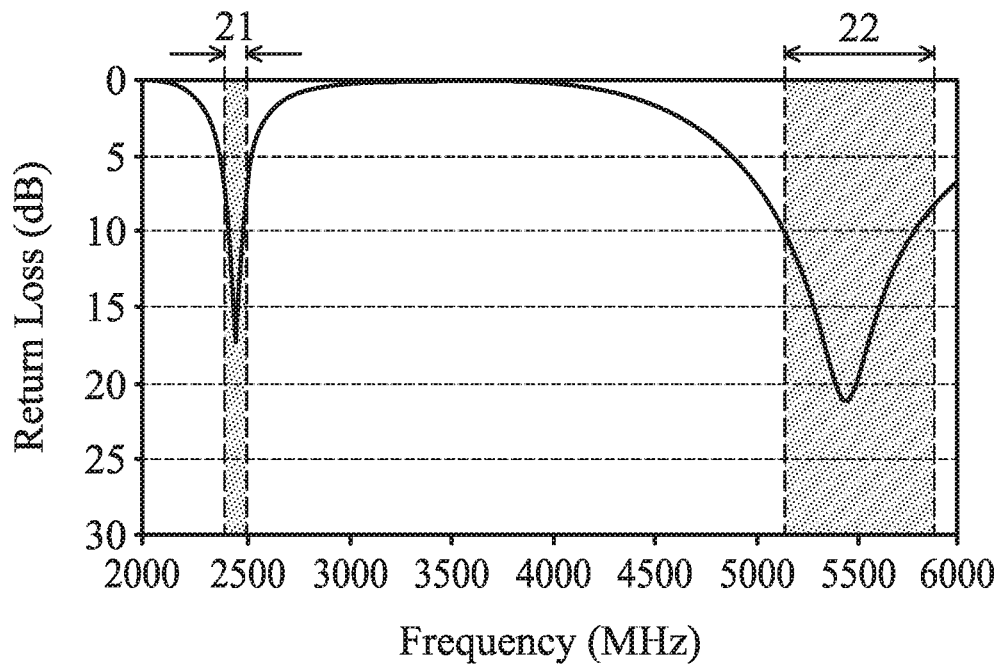
FIG. 2 is a diagram of return loss of an antenna element of a communication device according to a first embodiment of the invention.

FIG. 2 is a diagram of return loss of the antenna element 101 of the communication device 100 according to the first embodiment of the invention. According to the measurement of FIG. 2, the antenna element 101 can cover a first operation frequency band 21 and a second operation frequency band 22. The first operation frequency band 21 is lower than the second operation frequency band 22. For example, the first operation frequency band 21 may be from 2400 MHz to 2484 MHz, and the second operation frequency band 22 may be from 5150 MHz to 5850 MHz. Therefore, the antenna element 101 can support at least the wideband operations of WLAN (Wireless Local Area Network) 2.4 GHz/5 GHz.

In some embodiments, the operation principles of the antenna element 101 of the communication device 100 are described as follows. Since the area of the ground metal element 10 is larger than the area of the third metal element 14, the impedance of the ground metal element 10 is lower than the impedance of the third metal element 14. The first metal element 12 uses the first capacitive element 15 with larger capacitance so as to form a first path with lower impedance to the third metal element 14. Also, the first metal element 12 uses the second capacitive element 16 with smaller capacitance so as to form a second path with higher impedance to the ground metal element 10. According to practical measurements, such a design can cause the resonant currents from the signal feeding source 11 to be substantially distributed over the aforementioned three metal elements and the ground metal element 10 uniformly. In comparison to the conventional design, the invention can effectively make the ground plane currents uniformly distributed, and suppress the capacitively-coupling effect between each metal element and the ground metal element 10, thereby reducing the Q value of the antenna element 101.

When the antenna element 101 operates in the first operation frequency band 21, the inductive element 18 has small impedance and is almost used as a short-circuited element. At this time, a first current resonant path PA1 of the first operation frequency band 21 is from the signal feeding source 11 through the first metal element 12, the first capacitive element 15, the third metal element 14, the inductive element 18, and the second metal element 13 to the first open end 131. When the antenna element 101 operates in the second operation frequency band 22, the inductive element 18 has large impedance and is almost used as an open-circuited element. At this time, a second current resonant path PA2 of the second operation frequency band 22 is from the signal feeding source 11 through the first metal element 12, the first capacitive element 15, and the third metal element 14 to the second open end 142. Accordingly, the incorporation of the inductive element 18 can make the second operation frequency band 22 independent of the first operation frequency band 21, such that antenna designers can easily fine-tune the two operation frequency bands.

In some embodiments, the element parameters of the communication device 100 are described as follows. The dielectric substrate for supporting the antenna element 101 may have a length of about 18 mm, a width of about 3 mm, and a thickness of about 0.4 mm. The capacitance of the first capacitive element 15 may be from 2 to 5 times the capacitance of the second capacitive element 16. The inductance of the inductive element 18 may be from 4 nH to 12 nH. For example, the capacitance of the first capacitive element 15 may be about 0.7 pF, the capacitance of the second capacitive element 16 may be about 0.2 pF, and the inductance of the inductive element 18 may be about 5 nH, but they are not limited thereto. The total length LT of the antenna element 101 may be from 0.1 to 0.3 wavelength ($0.1\lambda{\sim}0.3\lambda$) of the lowest frequency of the first operation frequency band 21. The antenna height 143 of the antenna element 101 may be merely from about 2 mm to about 3 mm. The above ranges of element parameters are calculated and obtained according to many experiment results, and they help to optimize the operation frequency bandwidth and impedance matching of the antenna element 101.

Figure 3:
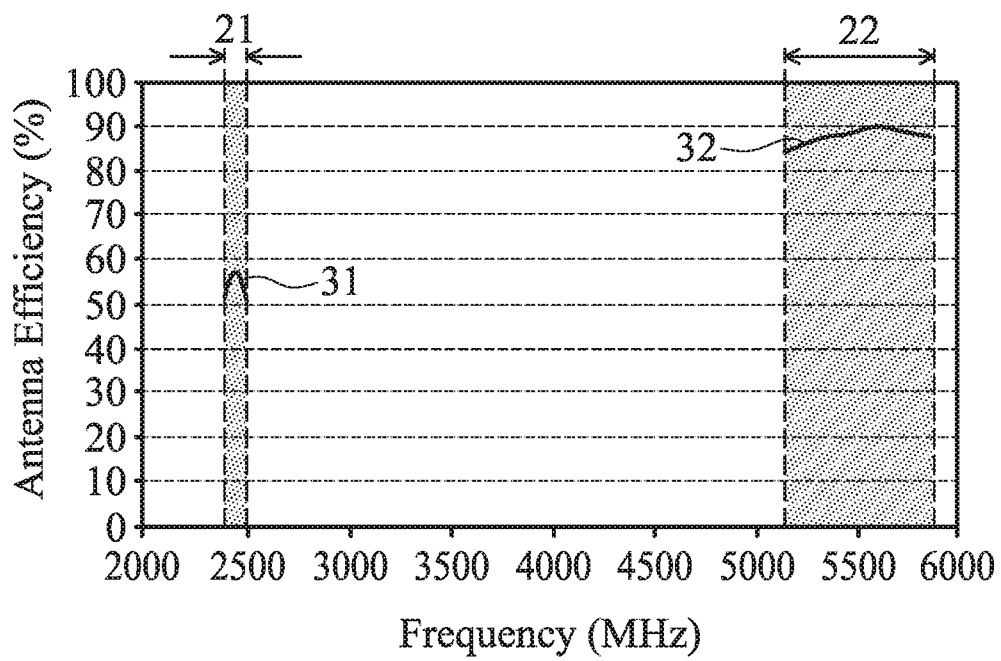
FIG. 3 is a diagram of antenna efficiency of an antenna element of a communication device according to a first embodiment of the invention.

FIG. 3 is a diagram of antenna efficiency of the antenna element 101 of the communication device 100 according to the first embodiment of the invention. According to the measurement of FIG. 3, a first antenna efficiency curve 31 of the antenna element 101 reaches 50% to 60% within the first operation frequency band 21, and a second antenna efficiency curve 32 of the antenna element 101 reaches 80% to 90% within the second operation frequency band 22. It can meet the requirements of practical application of general mobile communication devices.

Figure 4:
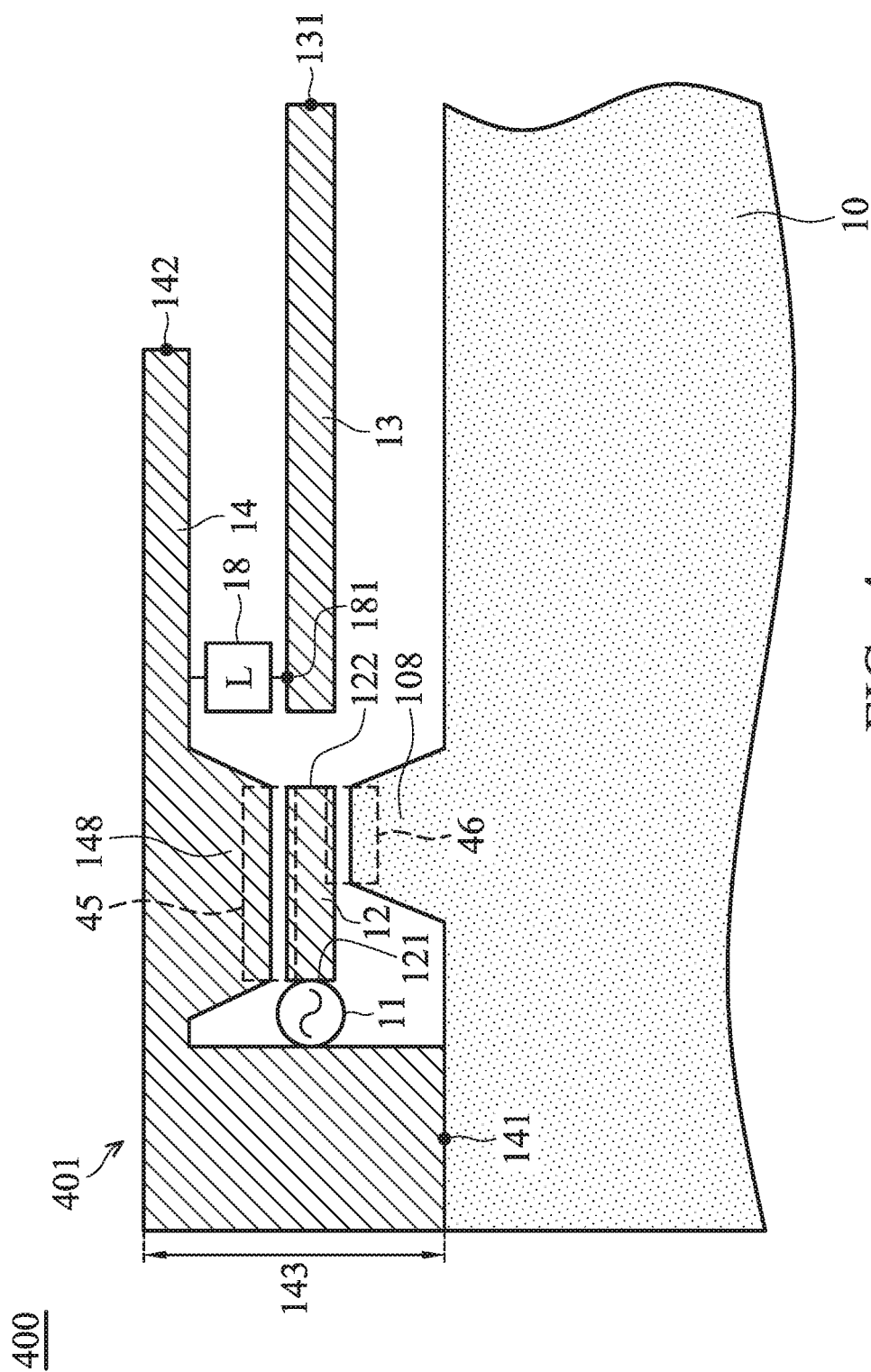
FIG. 4 is a diagram of a communication device according to a second embodiment of the invention.

FIG. 4 is a diagram of a communication device 400 according to a second embodiment of the invention. FIG. 4 is similar to FIG. 1. In an antenna element 401 of the communication device 400 of the second embodiment, the above first capacitive element 15 and second capacitive element 16 are implemented with a first distributed capacitor 45 and a second distributed capacitor 46, respectively. Specifically, the ground metal element 10 further includes a first protruding portion 108 extending toward the first metal element 12, and the second distributed capacitor 46 is formed by the first metal element 12 and the first protruding portion 108. In addition, the third metal element 14 further includes a second protruding portion 148 extending toward the first metal element 12, and the first distributed capacitor 45 is formed by the first metal element 12 and the second protruding portion 148. For example, any of the first protruding portion 108 and the second protruding portion 148 may substantially have a trapezoidal shape, a rectangular shape, a square shape, or a semicircular shape, but it is not limited thereto. Other features of the communication device 400 of FIG. 4 are similar to those of the communication device 100 of FIG. 1. Accordingly, the two embodiments can achieve similar levels of performance.

Figure 5:
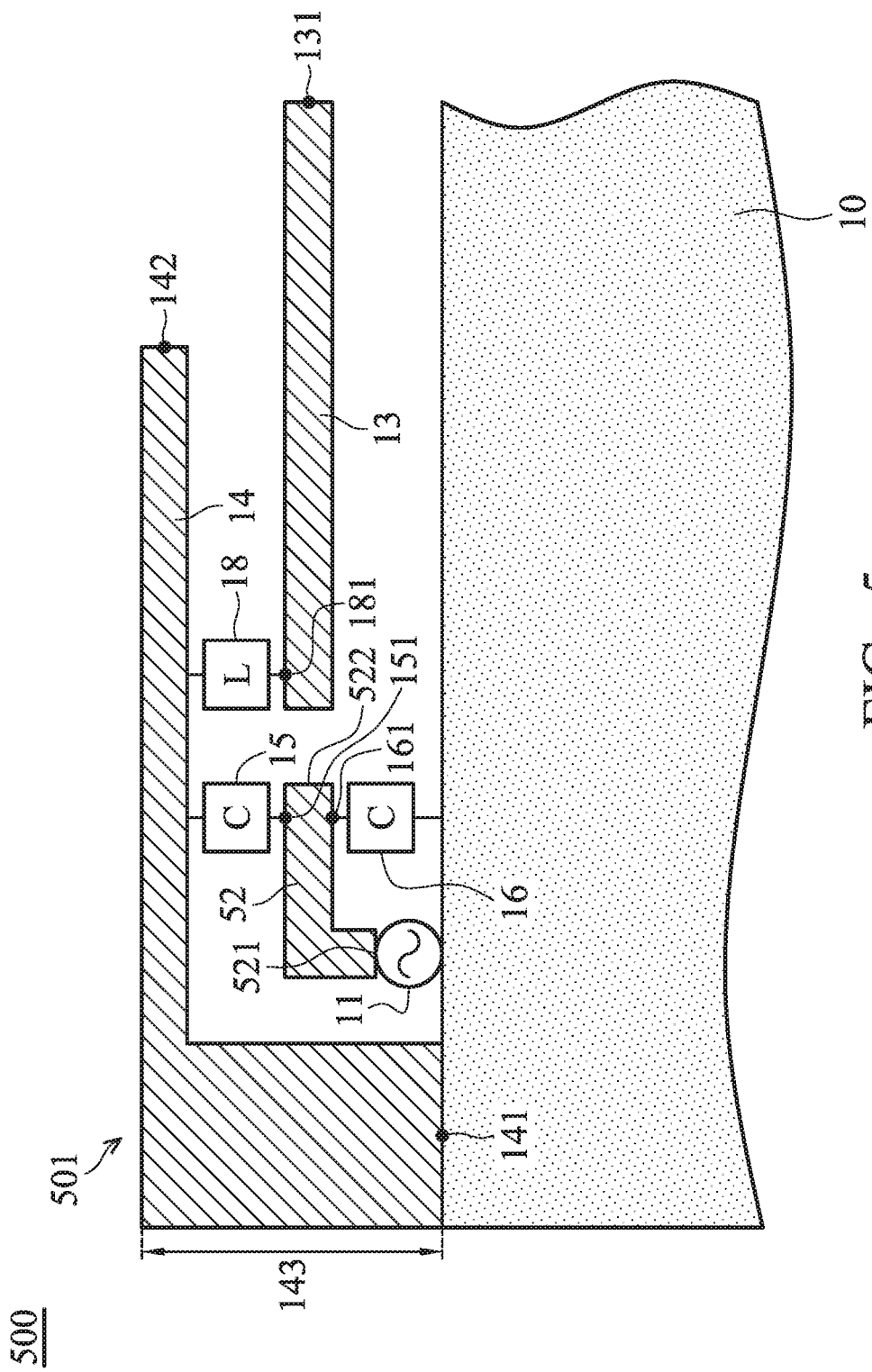
FIG. 5 is a diagram of a communication device according to a third embodiment of the invention.

FIG. 5 is a diagram of a communication device 500 according to a third embodiment of the invention. FIG. 5 is similar to FIG. 1. In an antenna element 501 of the communication device 500 of the third embodiment, a first metal element 52 substantially has an L-shape, and the signal feeding source 11 is coupled between a feeding end 521 of the first metal element 52 and the ground metal element 10. Other features of the communication device 500 of FIG. 5 are similar to those of the communication device 100 of FIG. 1. Accordingly, the two embodiments can achieve similar levels of performance.

Figure 6:
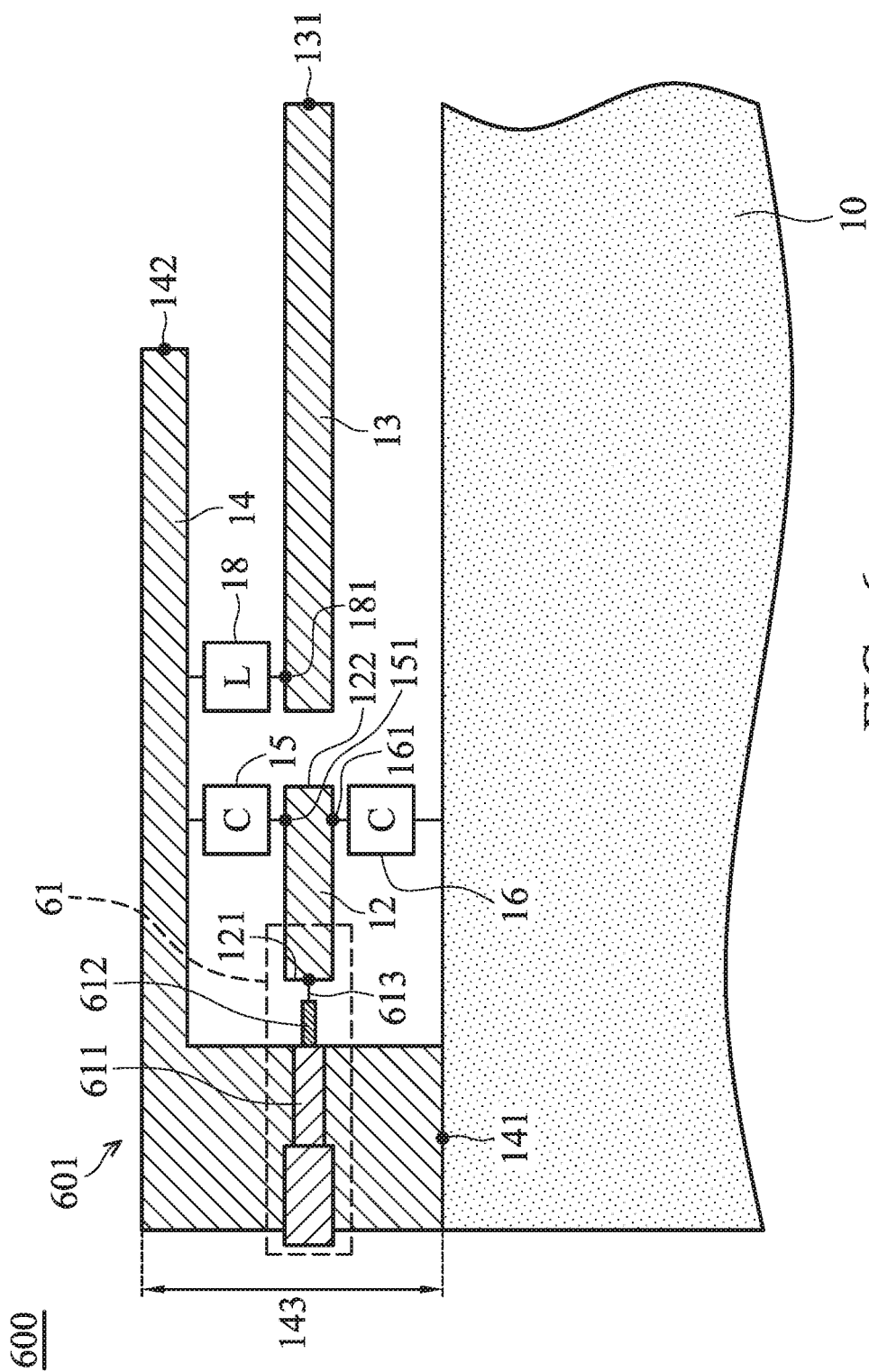
FIG. 6 is a diagram of a communication device according to a fourth embodiment of the invention.

FIG. 6 is a diagram of a communication device 600 according to a fourth embodiment of the invention. FIG. 6 is similar to FIG. 1. In an antenna element 601 of the communication device 600 of the fourth embodiment, the above signal feeding source 11 is implemented with a coaxial transmission line 61. Specifically, the coaxial transmission line 61 includes a ground portion 611, a plastic portion 612, and a central conductive line 613. The ground portion 611 is coupled to the third metal element 14. The central conductive line 613 is coupled to the feeding end 121 of the first metal element 12. It should be noted that the coaxial transmission line 61 is integrated with the antenna element 601, so as to avoid occupying the design space on the ground metal element 10. Other features of the communication device 600 of FIG. 6 are similar to those of the communication device 100 of FIG. 1. Accordingly, the two embodiments can achieve similar levels of performance.

Figure 7:
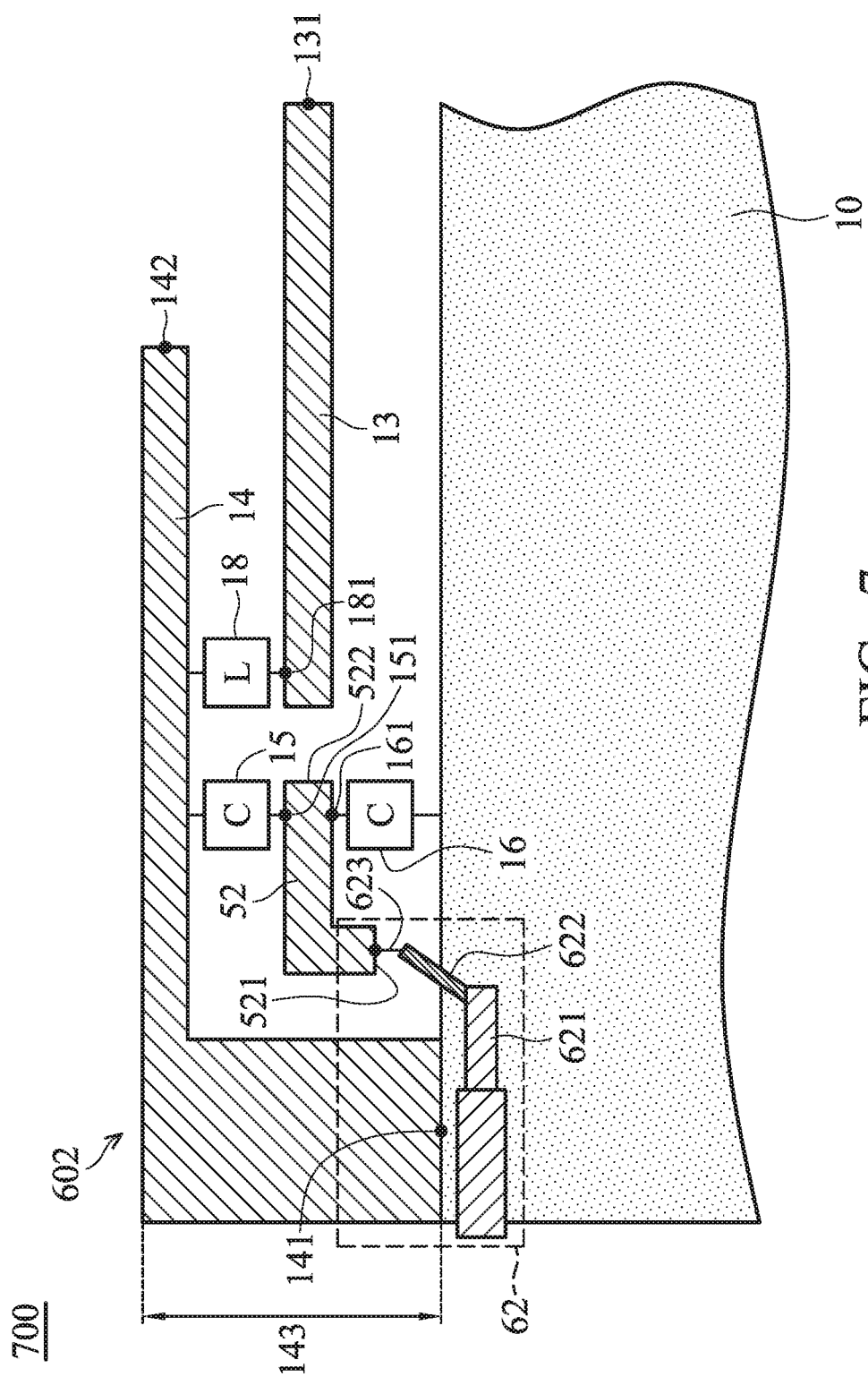
FIG. 7 is a diagram of a communication device according to a fifth embodiment of the invention.

FIG. 7 is a diagram of a communication device 700 according to a fifth embodiment of the invention. FIG. 7 is similar to FIG. 5. In an antenna element 602 of the communication device 700 of the fifth embodiment, the above signal feeding source 11 is implemented with a coaxial transmission line 62. Specifically, the coaxial transmission line 62 includes a ground portion 621, a plastic portion 622, and a central conductive line 623. The ground portion 621 is coupled to the ground metal element 10. The central conductive line 623 is coupled to the feeding end 521 of the first metal element 52. It should be noted that the coaxial transmission line 62 is integrated with the ground metal element 10, so as to increase the whole design flexibility. Other features of the communication device 700 of FIG. 7 are similar to those of the communication device 500 of FIG. 5. Accordingly, the two embodiments can achieve similar levels of performance.

The invention proposes a novel communication device and a novel antenna element. In comparison to the conventional design, the invention has at least the advantages of small size, wide bandwidth, low profile, and minimized antenna height, and therefore it is suitable for application in a variety of mobile communication devices.

Note that the above element sizes, element shapes, element parameters, and frequency ranges are not limitations of the invention. An antenna designer can fine-tune these settings or values according to different requirements. It should be understood that the communication device of the invention is not limited to the configurations of FIGS. 1-7. The invention may merely include any one or more features of any one or more embodiments of FIGS. 1-7. In other words, not all of the features displayed in the figures should be implemented in the communication device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication device, comprising:
    a ground metal element; and
    an antenna element, comprising:
        a first metal element, having a first connection point and a second connection point;
        a second metal element, having a third connection point and a first open end;
        a third metal element, having a shorting end and a second open end, wherein the shorting end is coupled to the ground metal element, and the second open end is kept apart from the ground metal element by an antenna height;
        a first capacitive element, wherein the first connection point is coupled through the first capacitive element to the third metal element;
        a second capacitive element, wherein the second connection point is coupled through the second capacitive element to the ground metal element;
        an inductive element, wherein the third connection point is coupled through the inductive element to the third metal element; and
        a signal feeding source, coupled between the first metal element and the third metal element or the ground metal element.

2. The communication device as claimed in claim 1, wherein the antenna element covers a first operation frequency band and a second operation frequency band, and the first operation frequency band is lower than the second operation frequency band.

3. The communication device as claimed in claim 2, wherein a first current resonant path of the first operation frequency band is from the signal feeding source through the first metal element, the first capacitive element, the third metal element, the inductive element, and the second metal element to the first open end, and wherein a second current resonant path of the second operation frequency band is from the signal feeding source through the first metal element, the first capacitive element, and the third metal element to the second open end.

4. The communication device as claimed in claim 2, wherein when the antenna element operates in the first operation frequency band, the inductive element is almost used as a short-circuited element, and when the antenna element operates in the second operation frequency band, the inductive element is almost used as an open-circuited element.

5. The communication device as claimed in claim 2, wherein a total length of the antenna element is from 0.1 to 0.3 wavelength of the lowest frequency of the first operation frequency band.

6. The communication device as claimed in claim 1, wherein the first metal element, the second metal element, and the third metal element extend in a same direction.

7. The communication device as claimed in claim 1, wherein the first metal element and the second metal element are at least partially surrounded by the third metal element and the ground metal element.

8. The communication device as claimed in claim 1, wherein a capacitance of the first capacitive element is from 2 to 5 times that of the second capacitive element.

9. The communication device as claimed in claim 1, wherein the first capacitive element and the second capacitive element are implemented with distributed capacitors.

10. The communication device as claimed in claim 1, wherein an inductance of the inductive element is from 4 nH to 12 nH.

* * * * *